United States Patent [19]

Peacock

[11] Patent Number: 4,930,447
[45] Date of Patent: Jun. 5, 1990

[54] DIVIDER GATE FOR PARALLEL DAIRY PARLOR

[76] Inventor: Steve N. Peacock, P.O. Box 1206, Anthony, N. Mex. 88021

[21] Appl. No.: 232,404

[22] Filed: Aug. 15, 1988

[51] Int. Cl.$^5$ .............................................. A01K 1/12
[52] U.S. Cl. ........................................ 119/27; 49/49; 49/501
[58] Field of Search .................... 119/14.03, 14.04, 27, 119/16, 11; 49/49

[56] References Cited

U.S. PATENT DOCUMENTS

| | | |
|---|---|---|
| 435,211 | 5/1893 | Rees . |
| 1,533,921 | 4/1925 | Kennedy ................. 49/49 |
| 3,264,786 | 5/1964 | Bettles .................... 49/70 |
| 3,456,619 | 7/1969 | Janson et al. .......... 119/11 |
| 3,810,442 | 5/1974 | Jacobs et al. .......... 119/14.03 |
| 4,124,954 | 11/1978 | Redick .................. 48/381 X |
| 4,362,127 | 12/1982 | Nielsen et al. ........ 119/14.03 |
| 4,452,175 | 6/1984 | Thompson et al. ..... 119/14.03 |
| 4,508,059 | 4/1985 | Anderson ............... 119/14.03 |
| 4,513,687 | 4/1985 | De Jong ............... 119/14.03 X |
| 4,715,321 | 12/1987 | Vandenberg et al. ... 119/14.03 |
| 4,715,322 | 12/1987 | Johansson ............. 119/27 |
| 4,813,379 | 3/1989 | Harmsen ............... 49/49 X |
| 4,854,268 | 8/1989 | Kipe ..................... 119/14.03 |

FOREIGN PATENT DOCUMENTS

| | | |
|---|---|---|
| 2541368 | 3/1977 | Fed. Rep. of Germany ........ 119/27 |
| 3113752 | 2/1982 | Fed. Rep. of Germany ... 119/14.03 |
| 7508041 | 1/1976 | Netherlands ............. 119/14.03 |
| 7802256 | 3/1977 | Netherlands . |

Primary Examiner—Robert P. Swiatek
Assistant Examiner—Nicholas D. Lucchesi
Attorney, Agent, or Firm—Charles W. Fallow; Martin P. Hoffman

[57] ABSTRACT

Each of a series of parallel stalls in dairy parlor includes a swinging entry gate having on one side of its hinge axis a major portion, normally blocking the stall mouth. A minor portion of the gate, on the other side of its hinge axis, protrudes partially across the mouth of a neighboring stall. The stall cannot be entered by an animal until the gate has been opened by the entry of a preceding animal into the neighboring stall. The gate has an effective width substantially greater than the stall width.

8 Claims, 3 Drawing Sheets

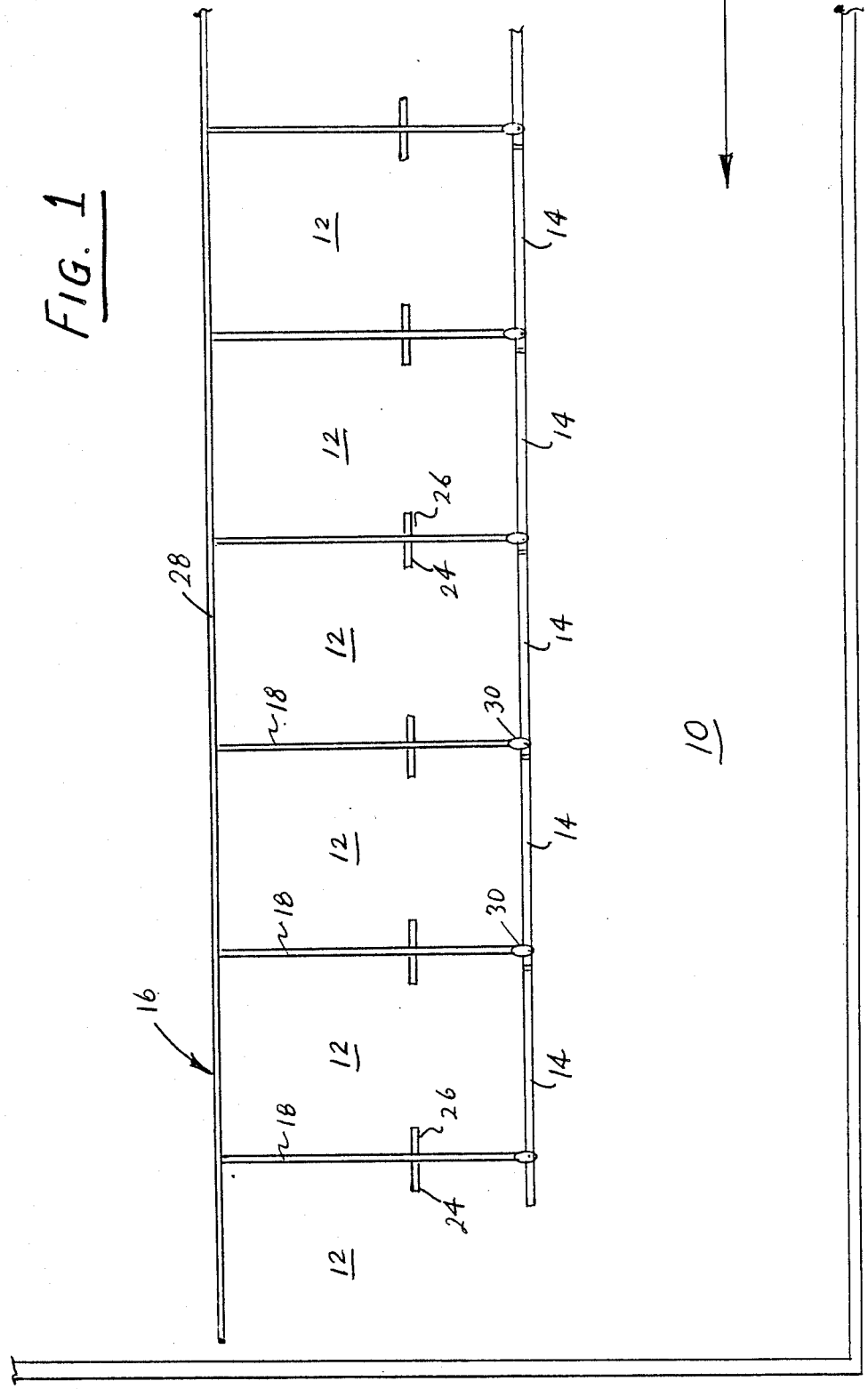

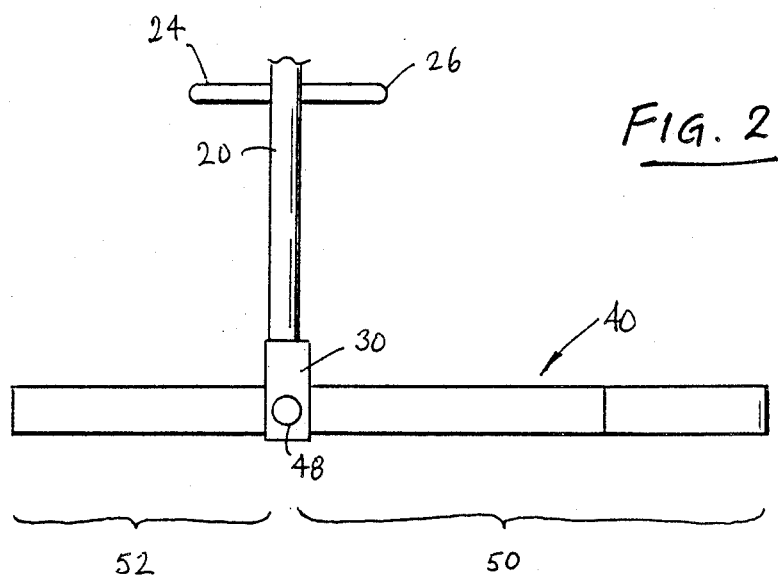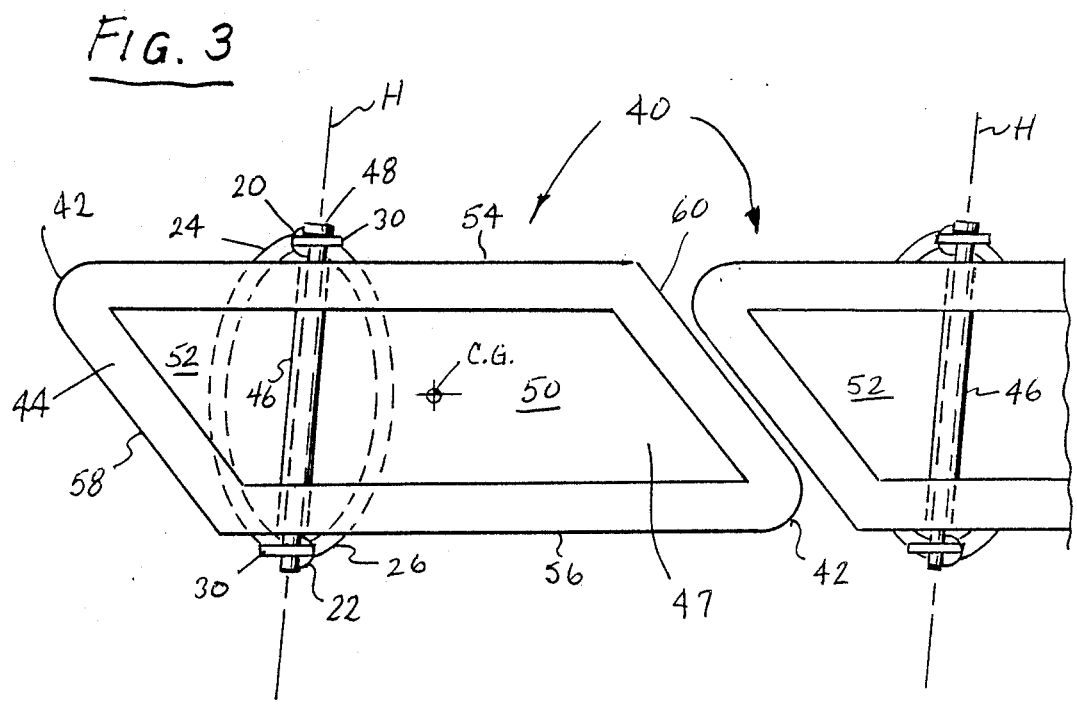

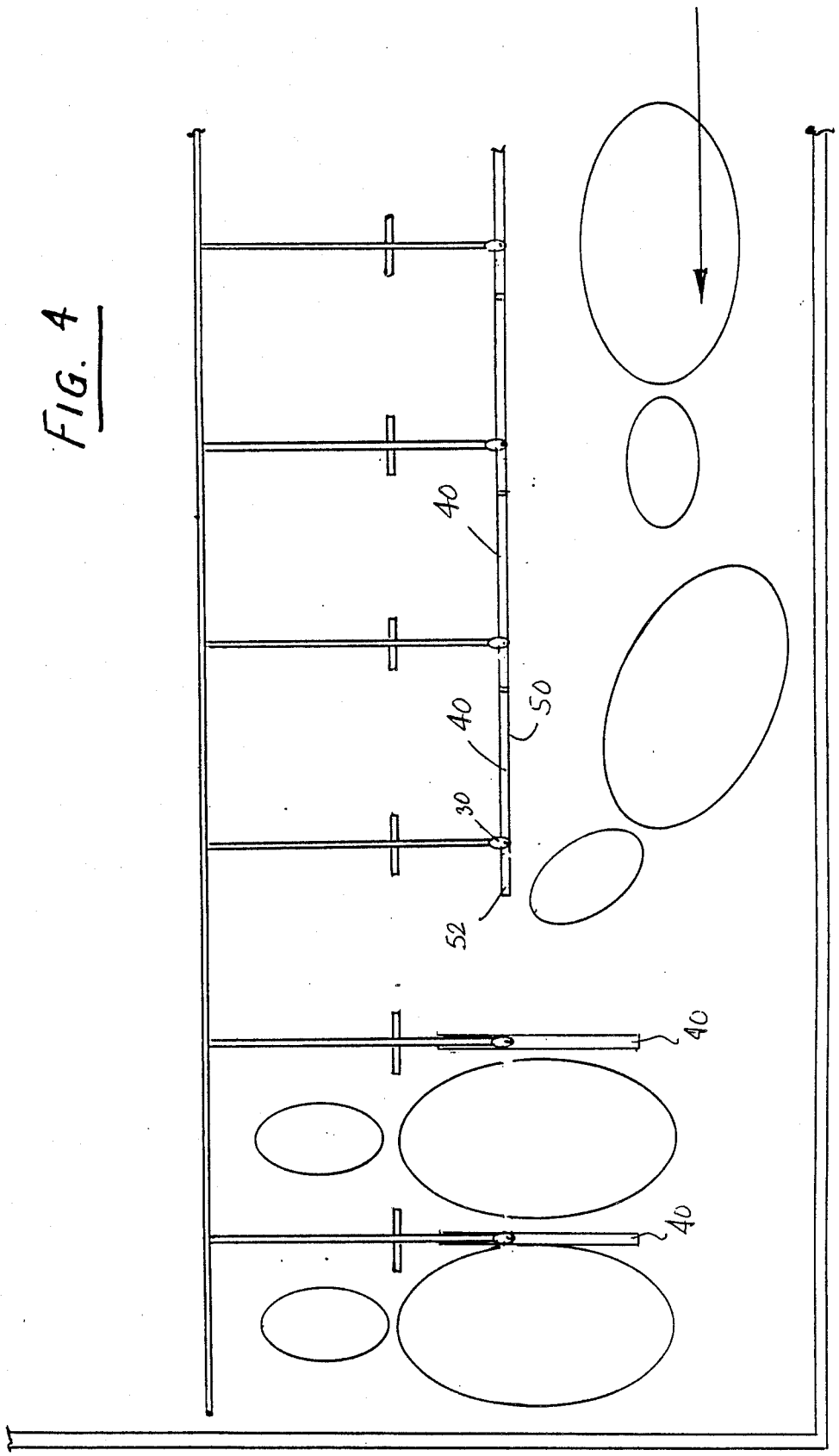

DIVIDER GATE FOR PARALLEL DAIRY PARLOR

BACKGROUND OF THE INVENTION

This invention relates to animal husbandry, and more particularly to a divider gate for a stall in a milking barn.

In a large cow milking operation, is important to produce an orderly but rapid flow of animals into and out of their stalls. It is highly desirable to prevent more than one animal from entering a given stall, and to ensure that all stalls are occupied. Prior inventors have addressed the problem with various arrangements of automatically controlled gates and/or shuttle platforms to direct animals into their stalls, and to release them from the same. Examples of such arrangements are disclosed in U.S. Pat. No. 3,810,442, No. 4,362,127, No. 4,452,175, No. 4,508,059, and No. 4,715,321. Control gates for feeding stalls have also been proposed. In U.S. Pat. No. 4,513,687, access to feed is controlled by a series of gates which are pivoted by animal contact from a normally closed position blocking the manger to an open position that laterally confines the animal.

In a parallel dairy parlor, the length of each stall is perpendicular to an aisle along which the cows file to the stalls. To fill the stalls in an orderly but rapid manner, it is best to fill the stall sequentially, beginning with the stall at the far end of the aisle. This goal may be achieved by providing each stall with an entry gate which is normally closed and remains so except when opened by contact with the body of an animal entering an adjacent stall. In a dairy parlor, however, the gate width must be substantially greater than the width of the stall mouth, and this requirement cannot be attained by the gates disclosed in the prior art, whose width only equals the stall width. Substantially greater width is required to completely block the stall, when the gate is closed, and the aisle, when the gate is open.

It is therefore an object of the invention to provide a stall entry control gate, specifically for a parallel dairy parlor, which completely and firmly blocks access to a stall when closed, yet which is pivoted open readily upon contact by the preceding cow.

Another object is to ensure that stalls are filled in succession, and that none are left unoccupied.

A further object of the invention is to provide a stall entry gate whose effective width is substantially greater than the width of the stall mouth.

The above objects are met, without remote control, supervision, or complex mechanical operators, by a parallel dairy stall arrangement comprising a series of stalls separated by dividers, each stall having an entry gate and an exit gate, each entry gate being mounted on a respective one of the dividers on hinges forming a hinge axis, each entry gate being movable about the axis, between closed and open positions. A substantial portion of the entry gate lies on either lateral side of the hinge axis, so that a major portion of the gate extends across the mouth of the stall, normally preventing an animal from entering the stall, and a minor portion of the gate extends partially across the mouth of a neighboring stall. The gate comprises a panel defined by top and bottom edges and first and second lateral edges, and the lateral edges vertically overlap those of adjacent gates, so as to have an effective width greater than the width of the stall.

In the preferred configuration, each gate panel has the shape of a parallelogram.

BRIEF DESCRIPTION OF THE DRAWINGS

In the accompanying drawings, FIG. 1 is a plan view of a parallel dairy parlor, showing a plurality of stalls having respective control gates, with detail omitted;

DESCRIPTION OF THE PREFERRED EMBODIMENTS

Figure 2:
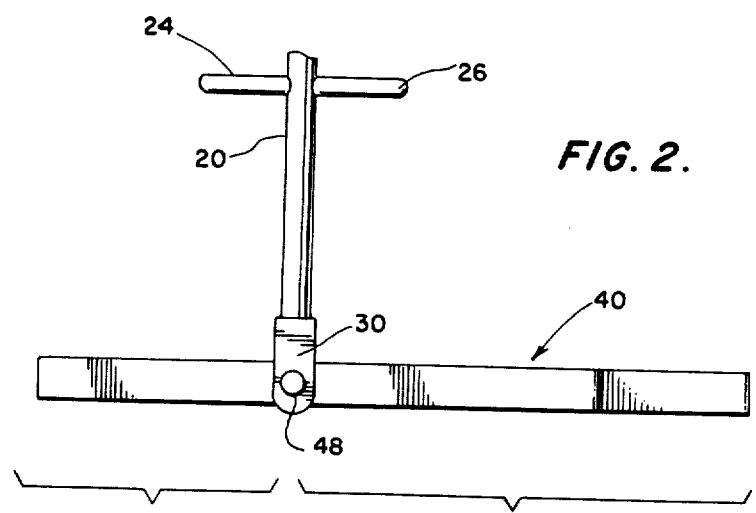
FIG. 2 is a detailed plan view of one control gate embodying the invention.

As shown in FIG. 1, a parallel dairy parlor is provided with at least one aisle 10 and a series of stalls 12, each extending perpendicular to the aisle from one side thereof. The opposite side of the aisle is bounded by a wall or another series of stalls, entry into which is barred by appropriate means (not shown). Each stall 12 is provided with a entry control gate 14 which in its normal, closed position prevents animals from entering the stall; an exit control gate 16 prevents the animal from leaving the stall once it has entered. The exit control gate may be remotely controlled to release the animals when milking is done, either simultaneously or in sequence. The exit gate does not form part of this invention; examples of such gates may be found in the aforementioned patents.

Referring to FIG. 2, each stall 12 is delimited from its neighbor by a divider 18 extending perpendicular to the length of the aisle, between the entry and exit gates. The divider preferably is composed of upper and lower horizontal bars or tubes 20 and 22, reinforced by arcuate shoulder stops 24 and 26 extending laterally to either side of the divider. The bars 20 and 22 of the various stalls are interconnected by a frame 28 running parallel to the aisle 10.

Figure 3:
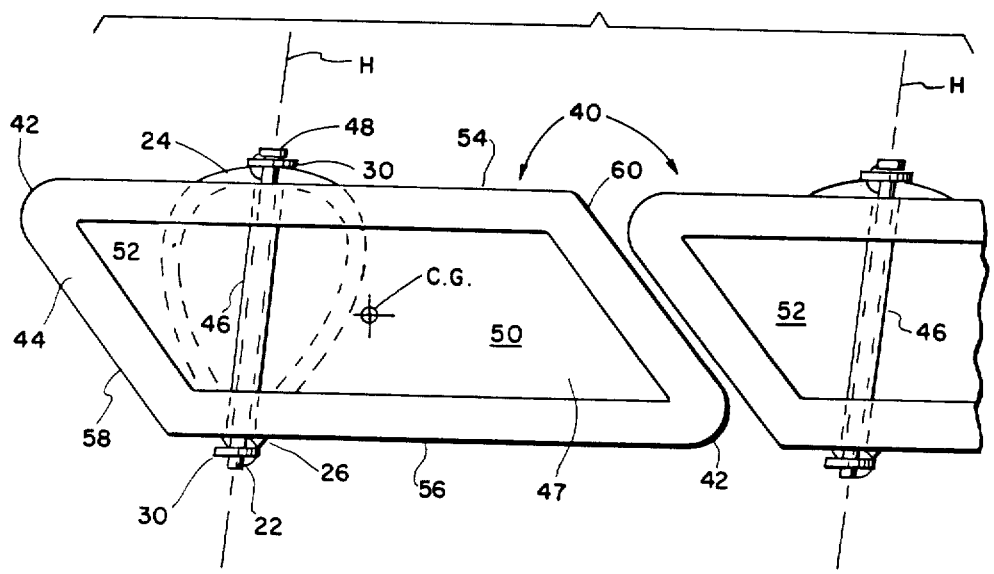
FIG. 3 is a front elevation thereof.
Figure 4:
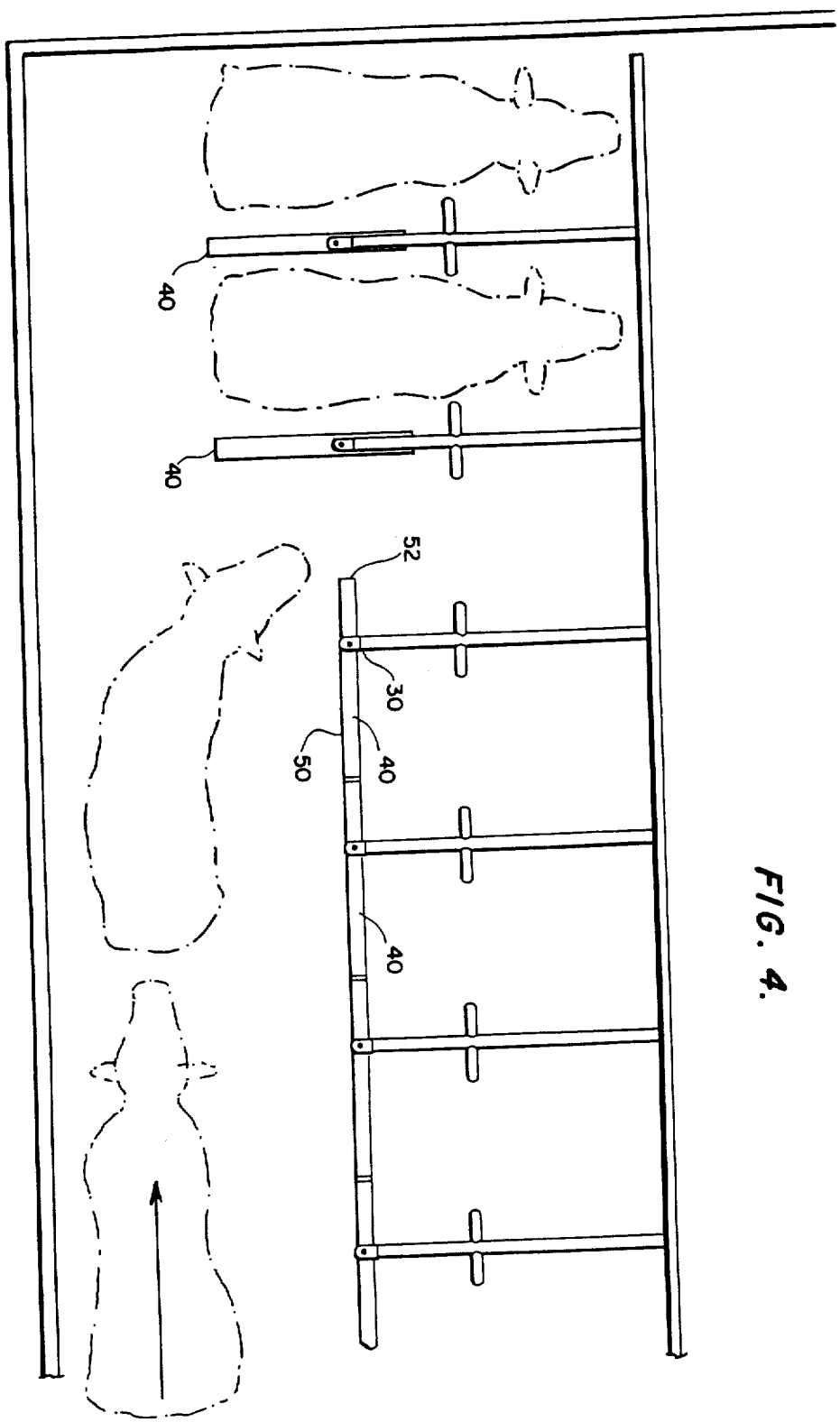
FIG. 4 is a plan view of a series of stalls, showing cows being loaded in succession by the control gates.

A hinge plate 30 is attached to the aisle end of each divider tube 20 and 22, defining a hinge axis H (FIG. 3). This axis is non-vertical, sloping steeply upward from left to right in FIG. 3. In fact, the direction of inclination is related to the direction of animal movement. In the drawings, animals move from right to left; were the direction of movement from left to right, the hinge axes would be inclined in the opposite direction, for reasons that will become apparent. Therefore, in the following claims, the direction of animal movement is referred to as "downstream", and the geometry of the gate s related to the downstream and upstream directions.

An entry gate 40 is mounted by and between the hinge plates 30. The gate comprises a panel, substantially a parallelogram in shape, except for the corners 42, which are rounded to prevent injury. The panel periphery is defined by two-inch square tubing 44. A three-quarter inch inside diameter pipe 46 is welded in place between the upper and lower edges of the panel: the axis of the pipe is offset in the downstream direction from the geometric center of the panel (and thus, from its center of gravity). The open areas between the tubing 44 and the pipe 46 are filled in with sheet metal panels 47. The gate 40 is pivotally attached to the divider 18 by means of a pin 48 of like diameter, which extends through both hinge plates 30 and the pipe 46.

The pipe 46, thus defining the hinge axis of the panel, divides the panel into two unequal portions: a major portion 50 to the right (upstream direction), and a minor portion 52 to the left. As location of the hinge axis is substantially aligned with the stall divider, the major portion 50 blocks most of the stall mouth to the right, and prevents an animal from entering, since the stop plate prevents the gate from being pushed in. The minor portion does not prevent an animal from entering a stall, if the adjacent gate has been opened by a preceding animal, but it does protrude sufficiently to the left that the preceding animal will strike it and push it forward upon entering its own stall, thereby opening the gate of the next stall for the succeeding animal. The major portion of the gate, when opened, protrudes into the aisle sufficiently to prevent animals from pushing past it, and again the stop plate keeps the gate from being pushed past its fully open position.

In order for the gate to be effective in blocking animals from either the stall or the aisle, depending upon its position, the gates must overlap. Such overlapping preferably is in the vertical direction, as shown in FIG. 2, where overlapping results from the parallelogram shape of the gates. In the preferred configuration, each gate has parallel top and bottom edges 54 and 56, and parallel lateral edges 58 and 60. As FIG. 3 shows, the lateral edges 58 and 60 incline upwardly and to the left, i.e., upwardly in the downstream direction, when the gate is closed.

While I prefer that each gate has the shape of a parallelogram, numerous other shapes may be suitable to cause the desired overlapping, and will occur to those of skill in the art.

Although it is preferred that the gates overlap in the vertical direction, it would be within the scope of this invention for the gates to overlap horizontally, that is, so that the surface of one panel would close over the surface of another. However, such an alternative would decrease aisle width slightly, and would mechanically interlock the gates, which might prove undesirable.

In operation, with all stalls empty, each gate 40 is held closed by its gravity bias, its major portion 50 blocking entry to the stall with which it is associated (except for the last stall, which has no gate). As cows file down the parlor aisle, the lead cow can enter only the last stall. In doing so, it brushes against the minor portion 52 of the last gate, thereby opening it. The second cow also has no option, and can enter only the next-to-last stall, opening the second gate in the process. The gates are thus opened successively, and the stalls are filled in succession, it being impossible for a stall to be left unfilled, or for a cow to remain in the aisle. Gate operation is fully automatic. Once milking is completed, the exit gate is raised to release the cows, the entry gates swing shut by their own gravity, and the stalls are ready for another cycle.

Inasmuch as the invention is subject to variations and changes in detail, it is intended that the foregoing description and the accompanying drawings shall be interpreted as only illustrative of the invention defined by the following claims.

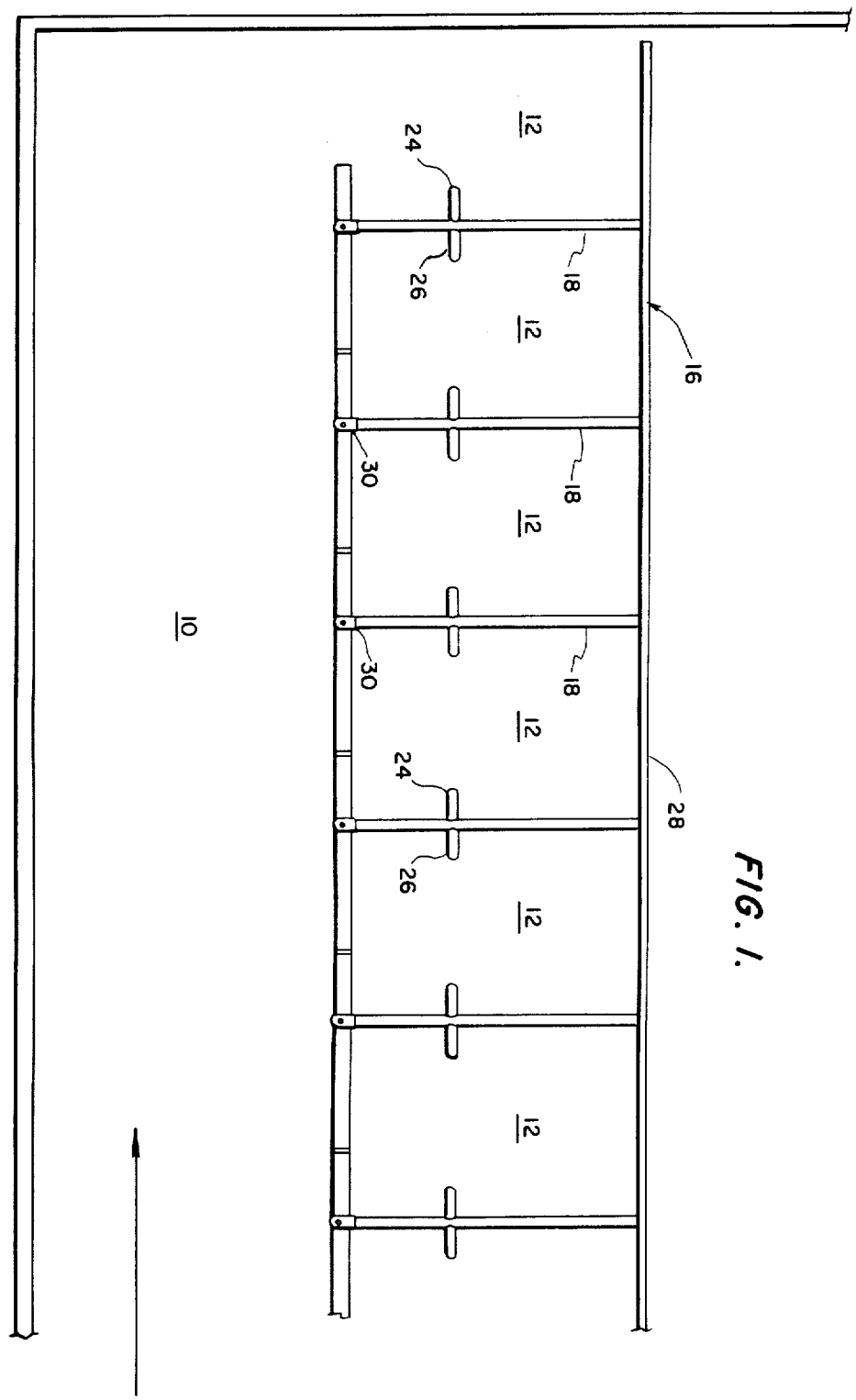

I claim:

1. In a parallel dairy stall arrangement comprising a series of stalls separated by dividers, each stall having an entry gate at its mouth, each entry gate being mounted on a respective one of said dividers on hinges forming a hinge axis, each entry gate being movable about said axis between closed and open positions, and with the entry gates being situated in a common substantially vertical plane in the closed position, a substantial portion of the entry gate lying on either lateral side of the hinge axis, so that when closed, a major portion of the gate extends partially across the mouth of a neighboring stall, the improvement wherein said gate comprising a panel defined by top and bottom edges and first and second lateral edges, with the effective width of said gate being greater than the width of the stall and one lateral edge overlapping a lateral edge of an adjacent gate.

2. The invention of claim 1, wherein adjacent gates overlap in a vertical direction.

3. The invention of claim 2, wherein said panel has substantially the shape of a parallelogram.

4. The invention of claim 3, wherein said lateral edges of the gate incline upwardly in the downstream direction of cow movement.

5. The invention of claim 1, wherein each entry gate is biased toward its closed position.

6. The invention of claim 5, wherein each entry gate has a center of gravity, and said hinge axis is non-vertical and is offset from said center of gravity, so that said gate is gravity biased towards its closed position.

7. The invention of claim 6, wherein the hinge axes of the respective gates are coplanar, and incline upwardly in the upstream direction, and are offset toward the downstream direction from the center of gravity of the gate.

8. The invention of claim 1, further comprising a stop mounted on the divider, said stop being positioned so as to permit the major portion of said gate to swing only between a closed position blocking said stall mouth, and an open position.

* * * * *

UNITED STATES PATENT AND TRADEMARK OFFICE
CERTIFICATE OF CORRECTION

PATENT NO. : 4,930,447

DATED : June 5, 1990

INVENTOR(S) : Steve N. Peacock

It is certified that error appears in the above-identified patent and that said Letters Patent is hereby corrected as shown below:

Substitute formal drawings for informal drawings.

Signed and Sealed this

Nineteenth Day of January, 1993

Attest:

DOUGLAS B. COMER

Attesting Officer     Acting Commissioner of Patents and Trademarks